United States Patent
Ollila et al.

(10) Patent No.: US 7,773,396 B2
(45) Date of Patent: Aug. 10, 2010

(54) PARALLEL CONNECTION OF INVERTERS

(75) Inventors: Jaakko Ollila, Pirkkala (FI); Pasi Kukkonen, Ruto (FI); Kimmo Rajakangas, Karperö (FI); Stefan Strandberg, Vörä (FI)

(73) Assignee: Vacon Oyj, Vaasa (FI)

( * ) Notice: Subject to any disclaimer, the term of this patent is extended or adjusted under 35 U.S.C. 154(b) by 271 days.

(21) Appl. No.: 11/902,003

(22) Filed: Sep. 18, 2007

(65) Prior Publication Data

US 2008/0073978 A1    Mar. 27, 2008

(30) Foreign Application Priority Data

Sep. 26, 2006    (FI) .................................. 20060854

(51) Int. Cl.
H02M 7/48    (2007.01)
H02J 1/10    (2006.01)

(52) U.S. Cl. ........................................ 363/72; 318/801
(58) Field of Classification Search .................... 363/41, 363/44, 65, 67, 69, 71, 72, 84, 87–89, 127–129, 363/132, 157, 159; 318/801; 307/82
See application file for complete search history.

(56) References Cited

U.S. PATENT DOCUMENTS

| 4,860,186 A | * | 8/1989 | Maekawa et al. | ............. 363/41 |
| 5,200,978 A | * | 4/1993 | Lo Curto et al. | ............. 375/286 |
| 5,390,102 A | * | 2/1995 | Araki | ......................... 363/71 |
| 5,460,244 A | * | 10/1995 | Tanahashi | ................... 187/293 |
| 5,956,244 A | * | 9/1999 | Rehm et al. | .................... 363/70 |

(Continued)

FOREIGN PATENT DOCUMENTS

JP    2002345252 A    11/2002

OTHER PUBLICATIONS

Holz, J. et al. 'Multi-inverter UPS system with redundant load sharing control'. IEEE Transactions on Industrial Electronics., Dec. 1990, vol. 37, No. 6, pp. 506-513.

(Continued)

*Primary Examiner*—Walter Benson
*Assistant Examiner*—Eduardo Colon-Santana
(74) *Attorney, Agent, or Firm*—Birch, Stewart, Kolasch & Birch, LLP

(57) ABSTRACT

Method for synchronizing inverter units (INU11, INU12) that are connected in parallel and supply a motor, and a parallel connection arrangement, in which motor is either one winding, which is supplied by inverter units connected in parallel, or a plurality of parallel windings, in which each winding is supplied by its own inverter unit, in which parallel connection one inverter unit functions as a master and the others as slaves, in which method a telecommunications bus is arranged between the units, and in which each inverter unit has its own modulation cycle counter, which are synchronized with each other on the basis of telecommunications messages, preferably serial telecommunications messages. In the invention all the inverter units take into memory the value of their own modulation counter at the termination time of a telecommunications message (Mes2), the master inverter unit sends the reading of its own counter in the following message to the other inverter units, and the other inverter units correct the reading notified by the master on the basis of the readings of their own modulation counters in the direction that makes the counters operate as simultaneously as possible.

11 Claims, 2 Drawing Sheets

U.S. PATENT DOCUMENTS

| | | | |
|---|---|---|---|
| 6,788,559 B2 * | 9/2004 | Sheng et al. | 363/72 |
| 7,126,409 B2 * | 10/2006 | Nielsen | 327/391 |
| 7,196,488 B2 * | 3/2007 | Matsubara et al. | 318/599 |
| 7,327,111 B2 * | 2/2008 | Rastogi et al. | 318/432 |
| 7,327,588 B2 * | 2/2008 | Ollila | 363/71 |
| 2002/0027791 A1 * | 3/2002 | Yoshioka et al. | 363/71 |
| 2004/0032755 A1 * | 2/2004 | Pollanen et al. | 363/71 |
| 2005/0117373 A1 * | 6/2005 | Ling | 363/71 |

OTHER PUBLICATIONS

Milosavljevic, I. Power electronics system communications. Master of science thesis. Virginia Polytechnic Institute. Jan. 14, 1999, pp. 3-21 through 3-22.

Yonghong, J. et al. 'Parallel operation of power electronic cells using serial communication for cell based converter architecture,' pp. 1156-1161, Nov. 17, 2003.

* cited by examiner

PARALLEL CONNECTION OF INVERTERS

FIELD OF TECHNOLOGY

The object of the present invention is a method for controlling inverter units that are connected in parallel and controlled with pulse width modulation (PWM), e.g. frequency converters. More particularly an object of the invention is a method for synchronizing inverter units that are connected in parallel and supply an alternating-current electric motor and that are based on both synchronous and asynchronous space-vector-based pulse width modulation methods. The invention also relates to an arrangement for the parallel connection of inverter units.

Parallel connection of frequency converters and their inverters is required in the control of motors of very high output power (e.g. >1 MW), because owing to the power components available the power handling capability of individual frequency converters is substantially smaller.

The greatest problem with a parallel connection is how the pulse waveforms of the PWM output voltages can be synchronized so as to be adequately concurrent. If the times when the voltage pulses change differ from each other, polyphase current develops between the units, which increases the switching and transmission losses of the power switches and through this reduces their load capacity.

PRIOR ART

What is essential in a parallel connection is to make the losses of the power switches roughly equal, which is dependent on the simultaneity of the gate controllers that control them being as precise as possible. In order to equalize the currents, and thus losses, normally a so-called disbalance adjustment is used, with which the currents are balanced over a long time span, but which nevertheless is not capable of correcting large timing errors in the control of the power switches.

Figure 1:
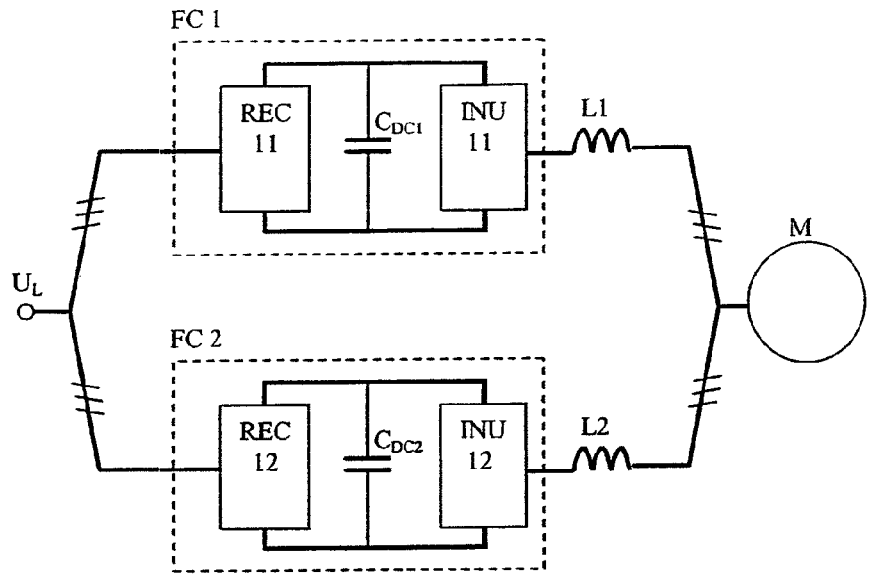

In practice, because the switching times are not with any certainty fully simultaneous, a compensating impedance must be added to the connection between the units (L1 and L2, FIG. 1).

A characteristic of a general purpose method is thus a starting point for a precise method of synchronizing modulation pulses. This is well known to be easily achievable by duplicating the modulation references optically. In practice at least six optic fibers are needed to control and collect the measuring information of six switches. A drawback of the duplication method is also that the timing of the pulses cannot easily be corrected in order to minimize residual errors.

SUMMARY OF THE INVENTION

When aiming for a simple and redundant parallel connection it would be extremely advantageous if one optic fiber pair or one bi-directional optic fiber per device were sufficient.

This invention presents a method based on master-slave control, with which the modulation waveforms can be synchronized in general purpose use in such a way also that symmetrical synchronous modulation, in which the modulation frequency is synchronized with the drive frequency, is possible. The method is based on the fact that the dedicated modulation counter of each inverter unit is synchronized via the serial telecommunications bus to the termination times of the messages sent. By means of the method it is possible to synchronize the modulation pulse waveforms of frequency converters connected in parallel, the basic frequency and the switching frequency with each other each time an external serial telecommunications message (Mes1, Mes2, . . . in FIG. 3) ends.

The invention allows increasing the power handling capability of a frequency converter with parallel connections in numerous applications such that the impedance needed to equalize the currents is small. Owing to the general purpose usability also so-called open-loop applications can be easily implemented without an equalizing current adjustment. The main applications include the main drives of ships, wind power plants of >1 MW output, step-up transformers provided with a plurality of primary windings, and high-powered pumps in the medium-speed of rotation range.

The characteristic features of the method according to the invention and of the frequency converter/inverter arrangement according to it are described in the claims below.

SHORT DESCRIPTION OF THE DRAWINGS

In the following, the invention will be described in more detail by the aid of an embodiment with reference to the attached drawings, wherein FIG. 1 presents two frequency converters connected in parallel, which supply a shared alternating-current electric motor.

Figure 2:
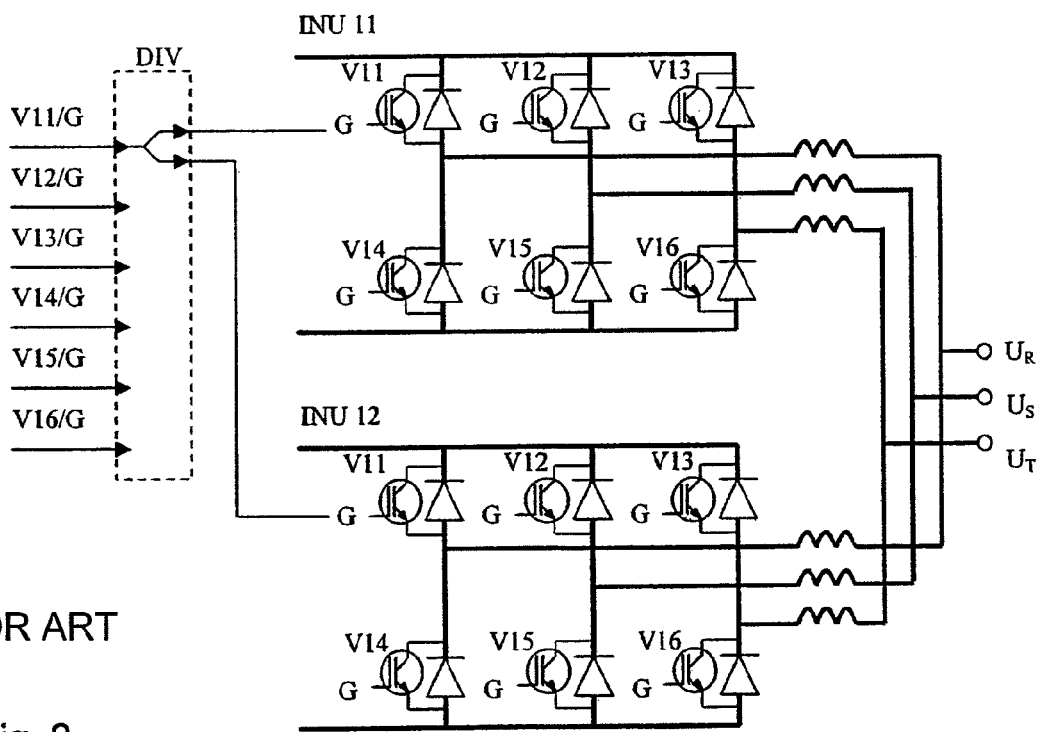

FIG. 2 presents a solution according to prior art for controlling frequency converters connected in parallel.

Figure 3:
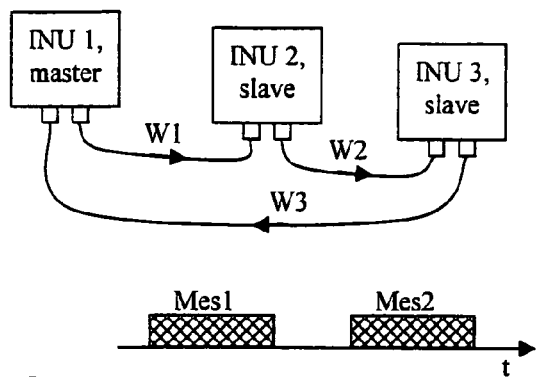

FIG. 3 presents the connection of the control circuits of inverters connected in parallel to each other according to the invention with a serial telecommunications bus and telecommunications messages moving in the bus.

Figure 4:
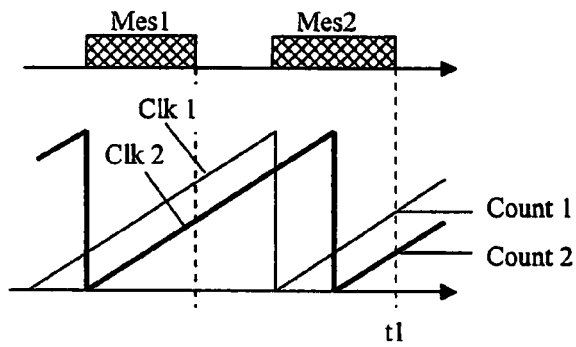

FIG. 4 presents a diagram of a reading of the modulation counters.

Figure 5:
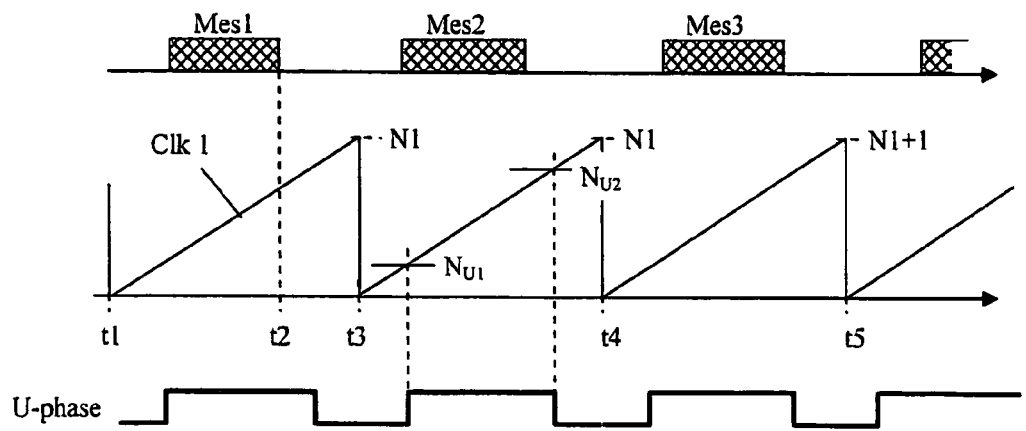

FIG. 5 presents a diagram of the synchronization of the modulation counters.

PRIOR ART AND DETAILED DESCRIPTION OF PREFERRED EMBODIMENTS OF THE INVENTION

FIG. 1 presents a motor drive, in which a high-output three-phase alternating-current electric motor M, which can be an asynchronous motor or a synchronous motor, is supplied by two three-phase PWM frequency converters FC1 and FC2 connected to a three-phase network $U_L$, in both of which is a rectifier bridge REC11, REC12, a DC-voltage intermediate circuit, in which is a capacitor $C_{DC1}$, $C_{DC2}$, and an inverter (INU-unit) INU11, INU12, in which is a full-wave bridge rectifier provided with semiconductor switches, such as IGBT, controlled by a gate, and its control. In the connection an equalizing impedance L1 and L2 has been added between the frequency converters.

FIG. 2 presents the parallel connection of inverter units according to prior art. The inverter units comprise the power switches V11-V16 and the diodes connected in parallel with them. The control pulses of the power switches formed by the common control unit in a parallel connection are divided into simultaneous galvanically distinguishable control pulses in the distribution unit DIV, e.g. according to the example in the figure the control signal V11/G is divided into the two signals INU11/V11/G and INU12/V11/G.

In the method according to the invention a ring-shaped optically isolated asynchronous serial telecommunications bus (fibers W1 . . . W3), along which messages (Mes1, Mes2) are sent cyclically in a fast time domain, connects the three parallel-connected INU units of the example of FIG. 3. Continuation of the bus from each INU unit onwards is implemented with fast circuits, in which case no significant delay occurs in the message traffic. One INU incorporated in the ring functions as the so-called master, which manages the counting of the modulation pulse waveform and duplicates it to the other so-called slave units by means of messages (Mes1, Mes2, etc.), which contain a go-command, a modulation index and the angle of the modulation reference Each INU unit contains its own counter for calculating the modulation pulse waveform. The modulation counter counts from zero to a defined maximum value, e.g. once in a modulation cycle, and the switching times of the power switches correspond to certain readings of the counter. In FIG. 5, for example, N1 is the maximum value of the modulation counter at the time t3 in the starting modulation cycle and $N_{U1}$, $N_{U2}$ are the readings of the counter corresponding to position changes of the phase switch U that the slave unit has counted based on the modulation index and the angle of the modulation reference.

Synchronization of the voltage pulse waveforms requires that the modulation counters can be synchronized, i.e. can be made to start a new cycle at the same moment in time. To synchronize the modulation cycles the INU-specific logic generates an interrupt request each time an external serial message (Mes1, Mes2, . . . ) ends. At the interrupt time the reading of the internal modulation counter is taken into memory e.g. by means of the so-called input capture input of the processor. In order to enable the timing according to the invention the HW solution of the serial telecommunications is implemented differently to the normal such that the master device also receives the message that it itself sends after it has circulated via the slave devices, and it takes the reading of its own modulation counter into memory at the time of receipt.

FIG. 4 presents a diagram of the reading of the modulation counters. Clk1 presents the modulation counter of the master device and Clk2 the counter of the slave device. At the moment t1, when receipt of an external message ends, the readings of the modulation counter are taken into memory (master: Count 1 and slave: Count 2).

FIG. 5 presents how the modulation counters are synchronized with each other. For example, the reading taken at the time t2 by the master device is sent to the other devices for information in the following message Mes2, after receiving which the slave devices compare their own readings to the reading of the master. If there is a sufficient difference in the readings, the length of the modulation cycle starting at the time t4 is corrected by one clock cycle either upwards or downwards, depending on the direction of the error (in the example of the figure N1+1 in the modulation cycle starting at the time t4). Thus all the pulse width modulations are synchronized in principle to an accuracy of one clock cycle.

Since in synchronized modulation the switching frequency is comparable to the drive frequency in a given integer number ratio, this can be taken into account by sending also the time of the modulation cycle (which in asynchronous modulation is a constant). In the slave units an addition of plus or minus one clock cycle correcting the length of the modulation cycle if necessary is added to the changeable time of the modulation cycle received from the master. Since information about the time of the modulation cycle of the master unit is received automatically in the slave units, this enables also a reduction function of the modulation frequency dependent on the heating of the power stage, with which the load capacity of the power part can be raised in high ambient temperatures.

The modulation index of the master unit, the angle of the modulation reference as well as the time of the modulation cycle can be made identical with respect to the slave units when they are implemented only on the following starting modulation cycle (=e.g. by assuming in the example of FIG. 5 that the cycle time of the counter corresponds to the modulation cycle, the references notified at the time t2 are only implemented on the modulation cycle starting at the time t3).

In order to synchronize modulation the fastest reasonable transmission interval of a synchronization message according to prior art is once in a modulation cycle, because with conventional timer implementations it is possible to change the time of the cycle only a modulation cycle at a time. In the solution according to the invention two angles of the modulation angle are for this reason sent in the message (e.g. $N_{U1}$, $N_{U2}$ in FIG. 5), in which case the halves of the modulation cycle can have different angle values according to sine-wave modulation. This is an advantage especially with large output frequencies, in which case there are few angle axes in the cycle of the basic wave.

With large switching frequencies in order to reduce the processor load it is preferable to send a synchronization message e.g. every second modulation cycle or less frequently, and four angles instead of the two angle values of the modulation reference. In the method according to the invention the cycle time of the modulation counters does not thus need to be the same as the cycle time of the serial telecommunications connecting the units.

The method can also be used without a separate timer input for the interrupt signal, if a timer is not available, by taking the instantaneous value of the clock counter used for pulse width modulation in the interrupt service upwards with software immediately at the start of the interrupt service. In this connection there a jitter enters the timing, because the processor can only be momentarily in interrupt denial. The error can be reduced by filtering the difference signal and by rejecting errors that are clearly too great.

It is obvious to the person skilled in the art that the different embodiments of the invention are not limited solely to the example described above, but that they may be varied within the scope of the claims presented below. The motor contains either one winding, which is supplied by inverter units connected in parallel, or a plurality of parallel windings, in which each winding is supplied by its own inverter unit.

The invention claimed is:

1. A method for synchronizing plural parallel-connected inverter units configured to supply current to a motor,
    wherein the motor includes either one winding, which is supplied by the plural parallel-connected inverter units connected in parallel, or the motor includes several parallel windings, in which each the several parallel windings is supplied by a corresponding one of the plural parallel-connected inverter units,
    wherein a first of the parallel connection inverter units functions as a master inverter unit and the other parallel connection inverter units function as slave inverter units, and
    wherein each of the parallel connection inverter units includes a corresponding modulation cycle counter, the method comprising:
    automatically storing, by each of the plural parallel-connected inverter units, a value based on an instantaneous value of a clock counter used for pulse width modulation;
    reading, by each of the plural parallel-connected inverter units, the corresponding stored inverter unit modulation counter value at a termination time of a first telecommunications message;
    sending a master inverter unit modulation counter value from the master inverter unit to the slave inverter units via a second message; and correcting, by each of the slave inverter units, a corresponding slave inverter unit modulation counter based on the master inverter unit modulation counter value.

2. The method according to claim 1, wherein the second message comprises a modulation index of the master inverter unit, a modulation angle of the master inverter unit, and a length of a switching cycle of the master inverter unit.

3. The method of claim 2, wherein the modulation angle of the master inverter unit comprises:
   two modulation angles, each modulation angle corresponding to a half of a corresponding modulation cycle.

4. The method of claim 2, wherein the modulation angle of the master inverter unit comprises:
   plural modulation angles, each modulation angle corresponding to a fraction of a corresponding modulation cycle.

5. The method according to claim 1, wherein a transmission time of the first message is unsynchronized with a starting time of an inverter modulation cycle.

6. The method according to claim 1, further comprising:
   sending a synchronization message to each of the plural parallel-connected inverter units; and
   only the master inverter unit using the synchronization message to record a corresponding modulation counter value.

7. Plural parallel-connected inverter units configured to supply current to a motor,
   wherein the motor includes either one winding, which is supplied by the plural parallel-connected inverter units connected in parallel, or the motor includes several parallel windings, in which each the several parallel windings is supplied by a corresponding one of the plural parallel-connected inverter units,
   wherein a first of the parallel connection inverter units functions as a master inverter unit and the other parallel connection inverter units function as slave inverter units, and
   wherein each of the parallel connection inverter units includes a corresponding modulation cycle counter, the plural parallel-connected inverter units configured to:
   automatically store a value based on an instantaneous value of a clock counter used for pulse width modulation,
   read the corresponding stored inverter unit modulation counter value at a termination time of a first telecommunications message,
   send a master inverter unit modulation counter value from the master inverter unit to the slave inverter units via a second message, and
   correct, by each of the slave inverter units, a corresponding slave inverter unit modulation counter based on the master inverter unit modulation counter value.

8. The plural parallel-connected inverter units according to claim 7, further comprising:
   a ring-shaped and optically isolated telecommunications bus arranged between the plural parallel-connected inverter units.

9. The plural parallel-connected inverter units of claim 7, wherein the second message comprises a modulation index of the master inverter unit, a modulation angle of the master inverter unit, and a length of a switching cycle of the master inverter unit.

10. The plural parallel-connected inverter units of claim 9, wherein the modulation angle of the master inverter unit comprises:
   two modulation angles, each modulation angle corresponding to a half of a corresponding modulation cycle.

11. The plural parallel-connected inverter units of claim 9, wherein the modulation angle of the master inverter unit comprises:
   plural modulation angles, each modulation angle corresponding to a fraction of a corresponding modulation cycle.

* * * * *